(12) United States Patent
Rolla (10) Patent No.: US 11,485,008 B2
(45) Date of Patent: Nov. 1, 2022

(54) ROD FOR HANDLING A TOOL PROVIDED WITH A DEVICE FOR ADJUSTING ITS LENGTH

(71) Applicant: GB PROGETTI S.R.L., Rivanazzano Terme (IT)

(72) Inventor: Alberto Rolla, Manciano (IT)

(73) Assignee: GB PROGETTI S.R.L., Rivanazzano Terme (IT)

( * ) Notice: Subject to any disclaimer, the term of this patent is extended or adjusted under 35 U.S.C. 154(b) by 434 days.

(21) Appl. No.: 16/618,914

(22) PCT Filed: Jun. 15, 2018

(86) PCT No.: PCT/IB2018/054434
§ 371 (c)(1),
(2) Date: Dec. 3, 2019

(87) PCT Pub. No.: WO2018/229728
PCT Pub. Date: Dec. 20, 2018

(65) Prior Publication Data
US 2020/0086473 A1 Mar. 19, 2020

(30) Foreign Application Priority Data
Jun. 16, 2017 (IT) .......................... 102017000067513

(51) Int. Cl.
*B25G 1/04* (2006.01)
*A01D 46/26* (2006.01)

(52) U.S. Cl.
CPC ............... *B25G 1/04* (2013.01); *A01D 46/26* (2013.01); *A01D 2046/266* (2013.01)

(58) Field of Classification Search
CPC .......... B25G 1/04; B25G 1/043; A01D 46/26; A01D 2046/266
(Continued)

(56) References Cited

U.S. PATENT DOCUMENTS 3,603,623 A * 9/1971 Widman ............. B05C 17/0205
  192/81 C
5,088,147 A * 2/1992 MacMillan ............. E04F 21/06
  15/235.4
(Continued)

FOREIGN PATENT DOCUMENTS

CN 201878552 U 6/2011
EP 2705932 A1 3/2014
(Continued)

OTHER PUBLICATIONS

International Search Report and Written Opinion dated Nov. 28, 2018 for counterpart International Patent Application No. PCT/IB2018/054434.

*Primary Examiner* — Hadi Shakeri
(74) *Attorney, Agent, or Firm* — Shuttleworth & Ingersoll, PLC; Timothy Klima (57) ABSTRACT

A Manoeuvring rod comprising a first elongated portion tubular-shaped and provided with a handle portion configured to be grasped by a user, and a second elongated portion engaged to the working tool). The elongated portions are mutually telescopically engaged in such a way to be able to freely slide one with respect to the other. A blocking/unblocking device is then provided arranged to move from a blocking configuration, in which impedes the above disclosed free sliding, to an unblocking configuration, in which, instead, allows the above disclosed free sliding. The above mentioned movement of the blocking/unblocking device from the blocking configuration to the unblocking configuration, or vice versa, is directly actuated by the user by acting on a control member positioned at the handle portion.

13 Claims, 5 Drawing Sheets

(58) Field of Classification Search
USPC .......................................................... 81/177.2
See application file for complete search history.

(56) References Cited

U.S. PATENT DOCUMENTS

| | | | | |
|---|---|---|---|---|
| 6,912,938 B2* | 7/2005 | Kurtz | .................. | B25B 27/0035 |
| | | | | 81/177.2 |
| 7,631,389 B2* | 12/2009 | St. James | ................ | E04F 21/00 |
| | | | | 15/144.4 |
| 8,272,105 B2* | 9/2012 | Roman | ............... | E04F 21/1652 |
| | | | | 15/235.8 |
| 9,475,184 B2* | 10/2016 | Balestrieri | ................ | B25G 1/04 |
| 2006/0230581 A1* | 10/2006 | Richardson | .............. | B25G 1/04 |
| | | | | 16/429 |
| 2007/0072460 A1* | 3/2007 | Stahle | ................... | F16B 7/1445 |
| | | | | 439/141 |

FOREIGN PATENT DOCUMENTS

| | | | |
|---|---|---|---|
| WO | 0218802 | A1 | 3/2002 |
| WO | 2015073829 | A1 | 5/2015 |

* cited by examiner

Fig. 6D ers, or tools for catching objects, in particular
ROD FOR HANDLING A TOOL PROVIDED WITH A DEVICE FOR ADJUSTING ITS LENGTH This application is the National Phase of International Application PCT/IB2018/054434 filed Jun. 15, 2018 which designated the U.S.

This application claims priority to Italian Patent Application No. 102017000067513 filed Jun. 16, 2017, which application is incorporated by reference herein.

FIELD OF THE INVENTION

The present invention relates to a telescopic manoeuvring rod for handling a tool, for example a tool to be used in the agricultural field, such as a tool for harvesting small fruits, or a cutting tool, but also for handling a tool used for completely different purposes, both for household and industrial uses.

DESCRIPTION OF THE PRIOR ART

As known, many kinds of manoeuvring rods exist that are used for supporting a tool at a determined distance from the user, such as tools for harvesting fruits from trees, for cutting tree branches, but also tools for painting, or for polishing, or for brushing walls, or tools for catching objects, in particular from high shelves and closets, or for hanging objects, e.g. clothes, at a desired height, etc.

In order to permit a user to be held easily, also for a long working time, the manoeuvring rod should be very light, and at the same time, sufficiently stiff to hold the engaged tool. Generally, the manoeuvring rods used for handling a tool provide a handle portion at which a user grasps the rod, and a working end, at which the tool is engaged. The manoeuvring rod normally comprises 2 elongated elements telescopically engaged one within the other. Many different kinds of the above disclosed telescopic rods are known. These differ one from another essentially because of the mechanism used for extending, or for reducing the length, and for the mechanism used for blocking or unblocking the relative sliding.

In CN201878552 a manoeuvring rod is disclosed whose length is manually adjusted, by loosening a bushing, which blocks the sliding of a sliding portion with respect to a fixed portion, and by tightening again the bushing once the desired length of the rod is obtained. However, the operations necessary to manually adjust the rod length, both in the case of using the mechanism disclosed in CN201878552 and in the case of using other analogous mechanisms, since, normally, they are repeated many times during a working day, they imply an useless waste of time, besides implying, at the end of the day, a great and useless loss of time.

Another example of telescopic manoeuvring rod is described in EP2705932. In this case, the telescopic rod can be elongated, or shortened, by acting on a bottom arranged near the handle, in such a way to actuate an electric motor of which the rod is provided of, and that causes the screw to rotate in a direction of rotation, or in the opposite direction of rotation, and, therefore, a sliding element engaging with the screw to translate forwards, or backwards.

However, the solution provided in EP2705932 needs to equip the manoeuvring rod with a dedicated motor, with the relative mechanism of motion transmission, and with a supply of energy for the motor same. This implies a considerable increase in the weight and in the total costs of the manoeuvring rod, besides implying a mechanical complication of the same.

SUMMARY OF THE INVENTION

It is, therefore, an object of the present invention to provide a telescopic manoeuvring rod, which allows a user to handle a tool in a distant working area, which allows to manually adjust the length of the manoeuvring rod, and which allows to easily and quickly block the rod once the desired length is reached and without losing the handle position at which the user grasps the manoeuvring rod in working conditions.

This and other objects are achieved by a telescopic manoeuvring rod, which can be manually lengthened, or shortened, comprising:
a first elongated portion having a tubular shape and provided with a handle portion at which a user grasps said manoeuvring rod:
a second elongated portion telescopically engaged to said first elongated portion at a first end, and configured to freely slide with respect to the first elongated portion, said second elongated portion being engaged to a working tool at a second end;
a blocking/unblocking device arranged to move between a blocking configuration, in which impedes said second elongated portion to freely slide with respect to said first elongated portion, and an unblocking configuration in which allows said second elongated portion to freely slide with respect to said first elongated portion;
whose main characteristic is that it is, furthermore, provided:
a control member configured to be hand-operated by a user in order to cause said blocking/unblocking device to move from said blocking configuration to said unblocking configuration, and vice versa, said control member being positioned at said handle portion.

In particular, the solution provided by the present invention allows to adjust the rod length substantially without changing the user's grasp with respect to the working conditions, i.e. when the tool is working.

Other features and relative embodiments of the invention are defined by the dependent claims.

BRIEF DESCRIPTION OF THE DRAWINGS

The invention will now be shown with the following description of its exemplary embodiments, exemplifying but not !imitative, with reference to the attached drawings in which.

DESCRIZIONE DETTAGLIATA DI ALCUNE FORME REALIZZATIVE

Figure 1:
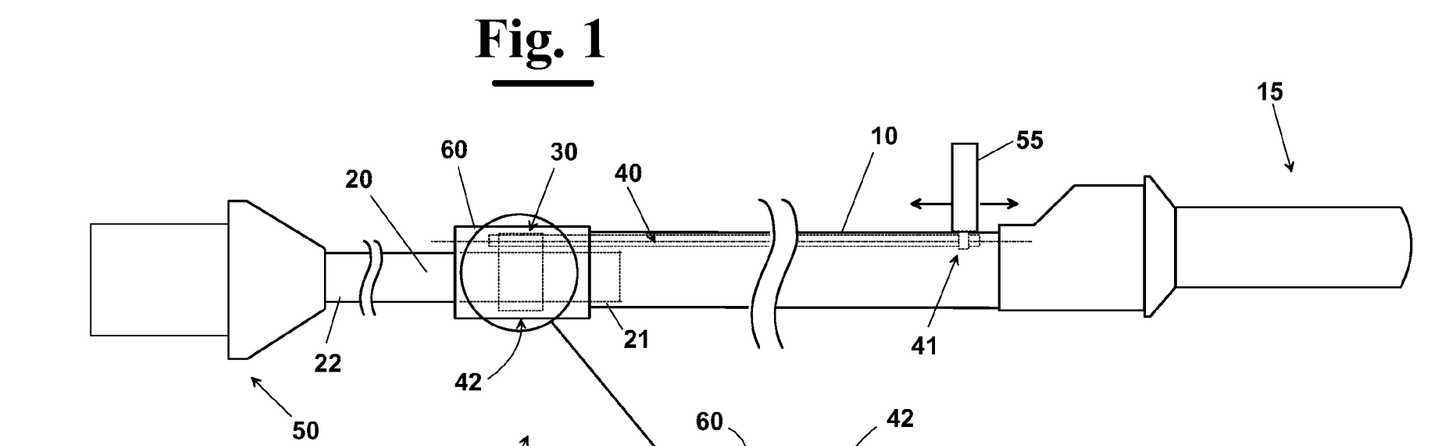
FIG. 1 diagrammatically shows a side elevational view of a telescopic manoeuvring rod, according to the invention.
Figures 3, 4:
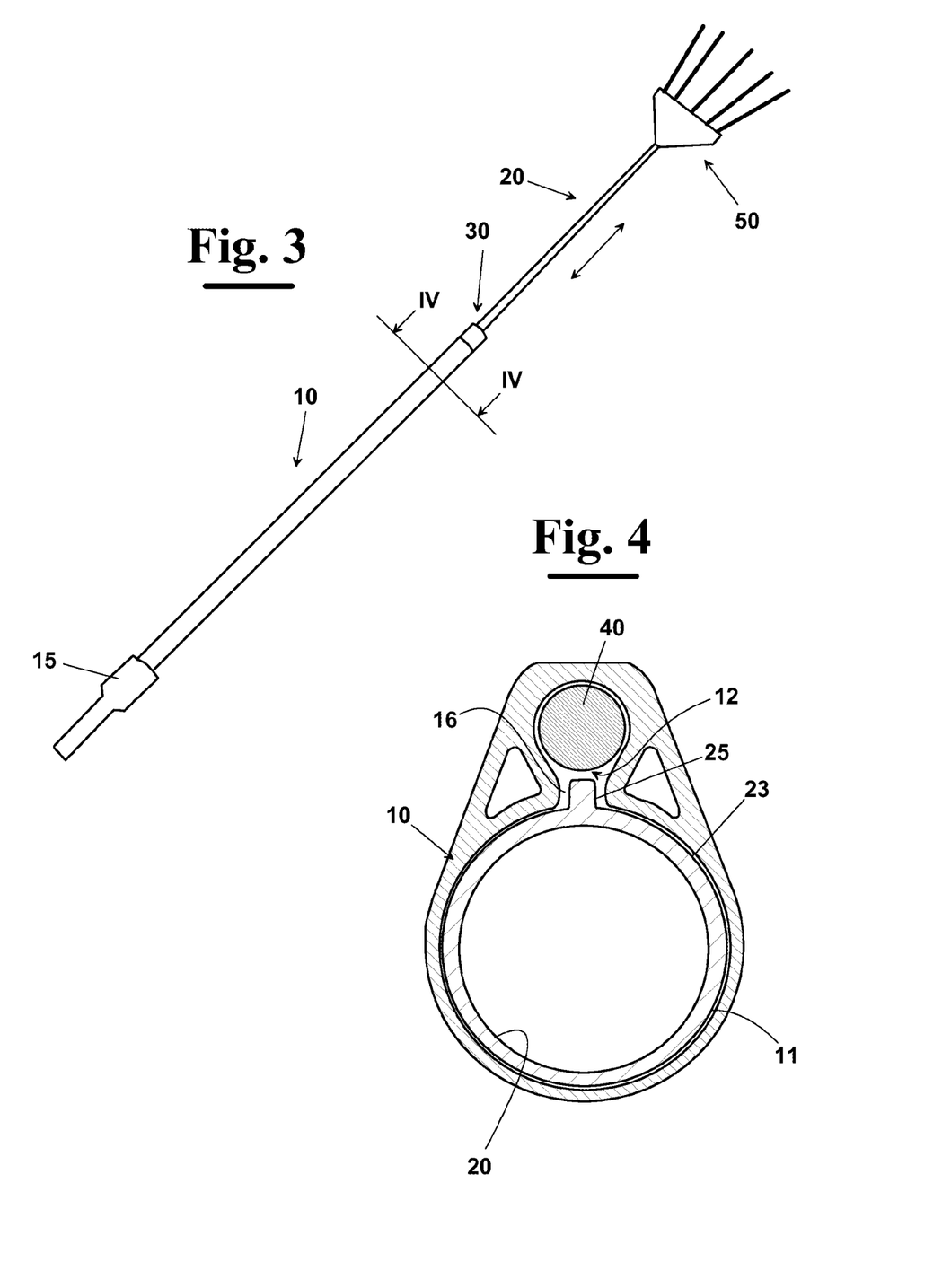
FIG. 3 diagrammatically shows a side elevational view of a possible embodiment of the rod of FIG. 1.
FIG. 4 shows a section according to arrows IV-IV of the rod of FIG. 3.

As diagrammatically shown in FIG. 1, a telescopic manoeuvring rod 1, according to the present invention, comprises a first elongated portion 10, preferably tubular-shaped, and provided with a handle portion 15 configured to be grasped by a user. The manoeuvring rod 1, furthermore, comprises a second elongated portion 20 telescopically engaged to the first elongated portion 10, at a first end 21, in such a way to be able to freely slide with respect to the first portion 10. The second portion 20 is, then, engaged at a second end 22 opposite to the first end 21, to a working tool 50. As shown in the example of FIG. 3, the working tool can be a motorized tool, for example a tool for shaking the branches of a tree in order to cause the fruits to fall down, but also any other kind of tool, for example a cutting tool, or a tool for brushing, or polishing surfaces, etc. The manoeuvring rod 1, according to the invention, comprises, furthermore, a blocking/unblocking device 30 arranged to impede/allow the second elongated portion 20 to freely slide with respect to the first elongated portion 10. More precisely, the blocking/unblocking device 30 is arranged to move between a blocking configuration, in which impedes the second elongated portion 20 to freely slide with respect to the first elongated portion 10, and an unblocking configuration in which, instead, the second portion 20 is free to translate with respect to the first portion 10.

According to the present invention, a control member 55 is furthermore provided configured to be hand-operated by a user in such a way to cause the blocking/unblocking device 30 to move from the above mentioned blocking configuration to the above mentioned unblocking configuration, or vice versa. More precisely, the control member 55 can be configured to rotate in a first and in a second opposite directions of rotation, or alternatively to translate in a first, or in a second opposite directions, or to make a first series of movements comprising at least a rotation and at least a translation, and at least a second series of movements also these comprising at least a rotation and at least a translation.

Figure 5:
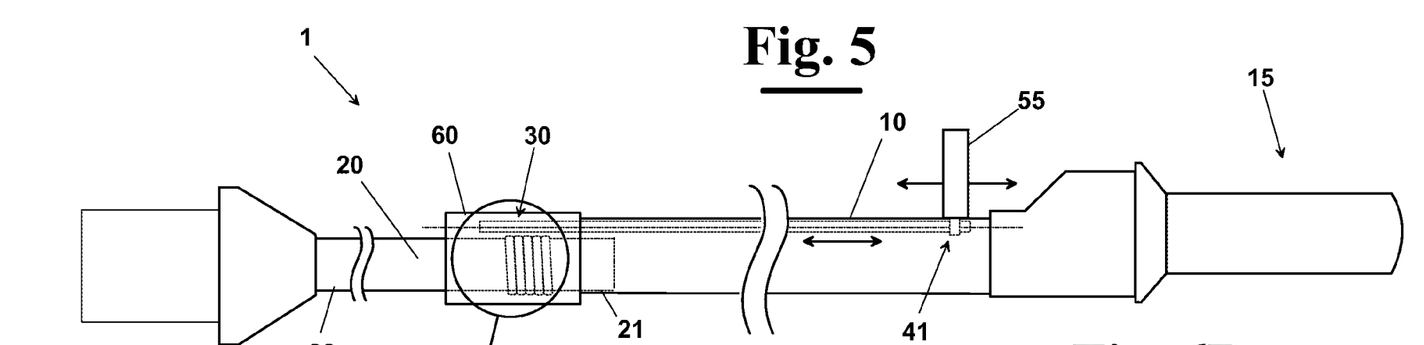
FIG. 5 diagrammatically shows a side elevational view of an alternative embodiment of the telescopic manoeuvring rod of FIG. 1.
Figures 7, 8:
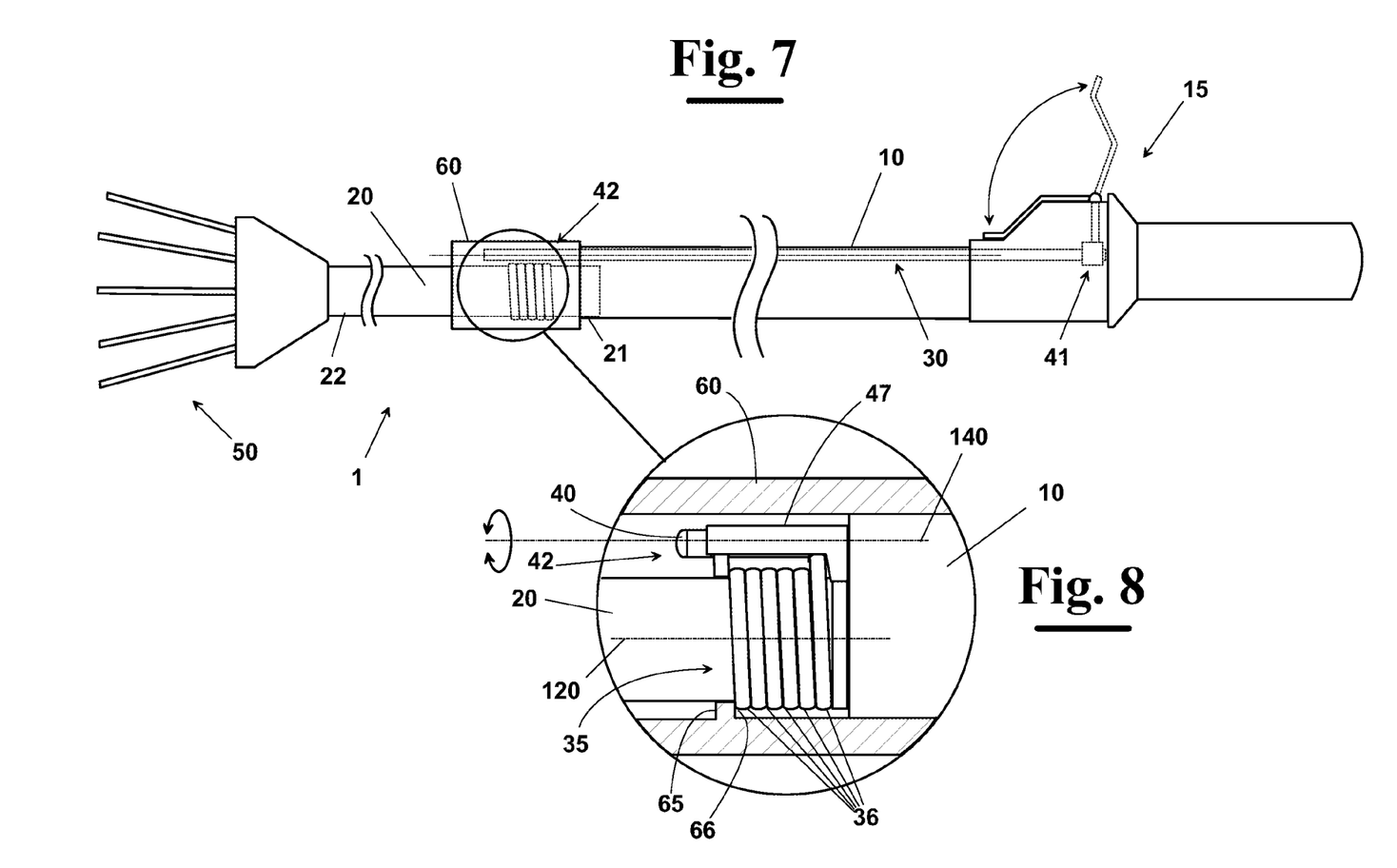
FIG. 7 diagrammatically shows a side elevational view of another alternative embodiment of the telescopic manoeuvring rod of FIG. 1.
FIG. 8 shows, in a partially sectioned view, an enlargement of a part of the manoeuvring rod of FIG. 7, in order to highlight some structural aspects.

In particular, as shown in the FIGS. 1, 5 and 7, the control member 55, for example a handle, can be positioned at the handle portion 15. In this way, the user can easily and comfortably block/unblock the free sliding of the second portion 20 with respect to the first portion 10 without losing the grasp of the manoeuvring rod 1, in particular without losing the grasp portion 15. In fact, it will be sufficient, for example, to lean on the ground the end of the manoeuvring rod 1 that holds the tool 50, to unblock the blocking/unblocking device 30 by acting on the control member 55, to withdraw, or to advance, a distance corresponding to the desired lengthening, or shortening, of the manoeuvring rod 1, and blocking again the sliding of the second elongated portion 20 with respect to the first portion 10 by acting again on the control member 55, all the above without never losing the grasp of the handle portion 15 where the user grasps the manoeuvring rod 1 during the normal working conditions.

Figure 2:
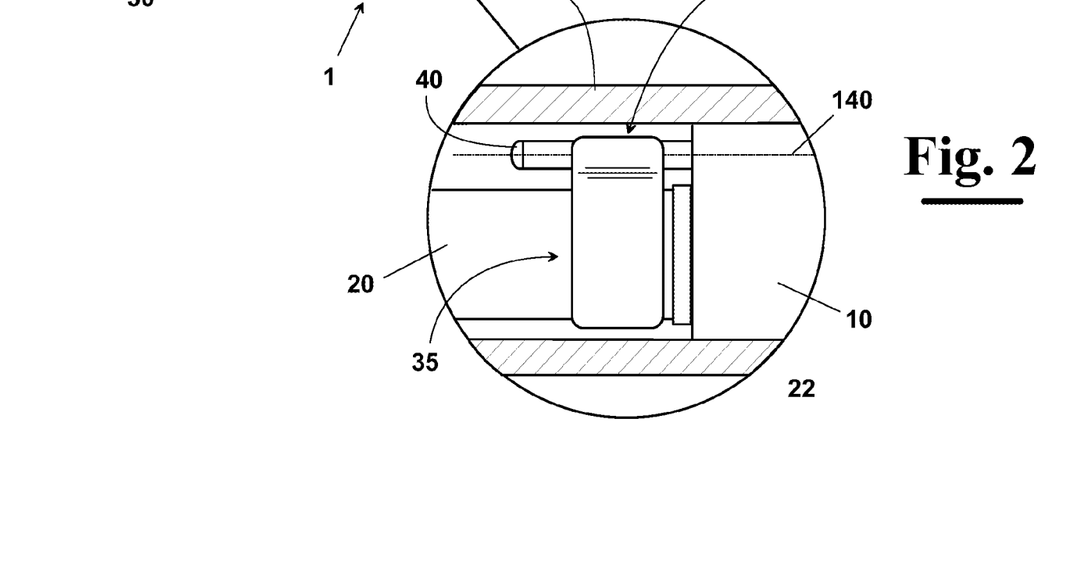
FIG. 2 shows, in a partially sectioned view, an enlargement of a part of the manoeuvring rod of FIG. 1, in order to highlight some constructive aspects.

As shown in the FIGS. 1 and 2, the blocking/unblocking device 30 can comprise, in particular, a blocking member 35, for example a pliers portion, or as described in detail in the following, at least a blocking member advantageously substantially annular-shaped, for example at least a turn of a clamping cable, or at least a blocking ring, or other similar elements.

More precisely, the blocking member 35 is configured to move from a blocking position of the second elongated portion 20, in which the blocking member impedes the second portion to freely slide with respect to the first elongated portion 10, and an unblocking position in which, instead, the blocking member does not impede the second portion to freely slide. In particular, an actuation member 40 is provided, for example an actuation bar, that is operatively connected to the control member 55 and to the blocking member 35, for example at a control portion 41, and at an actuation portion 42, respectively. The actuation member 40 is, advantageously, configured to actuate the above disclosed movement of the blocking member 35 from the blocking position to the unblocking position, and vice versa.

In particular, as illustrated in the exemplary embodiments of FIGS. 5 to 6B, 7 and 8, the blocking member 35 can be a clamping cable, for example a wire rope, advantageously made of steel, preferably constituted by a braid of very thin strands, which make the cable soft and pliable. More in particular, the clamping cable 35 is wound about the second elongated portion 20, in such a way to form at least a turn of coil, for example 5 turns of coil. In this way, the actuation member 40 is configured to move between an actuation position and a release position of the clamping cable 35. More in detail, when the actuation member 40 is arranged in the actuation position, it stretches the clamping cable 35 on which, therefore, a predetermined tensile force is exerted. Therefore, the clamping cable 35 tightens the second elongated portion 20 of the manoeuvring rod at the, or each, turn of coil 36, and, therefore, impedes the second elongated portion 20 to freely slide with respect to the first portion 10. Instead, when the actuation member 40 is arranged in the release position, the clamping cable 35 is not subjected to the above disclosed predetermined tensile force, and the, or each, turn of coil 36 is slack about the second elongated portion 20 and, therefore, allows the second elongated portion to freely slide with respect to the portion elongated 10.

The above disclosed technical characteristic of the present invention, therefore, allows, on the one hand, to assure that the second elongated portion 20 is firmly engaged to the first portion 10 in the working configurations of the manoeuvring rod 1, i.e. once the desired total length is set, on the other hand, to easily and quickly unblock the device, which firmly engages the two portions 10 and 20 of the manoeuvring rod 1 in order to adjust its length as desired. More in detail, the control member 55 is configured in such a way that, when the user manually acts on it, he can actuate it in such for causing the actuation member 40 to move from the actuation position to the release position, or vice versa.

In an exemplary is configured in such a way to move from the actuation position to the release position, or vice versa, through a rotation. In this case, see FIG. 8, when the actuation member 40 is rotated about its rotation axis 140, in a first direction of rotation, moves from the actuation position, in which the cable is subjected to a predetermine tensile force, to the release position of the cable in which is possible to lengthen, or to shorten, the manoeuvring rod 1 as desired. Instead, when the actuation member 40 is rotated in a second direction of rotation, opposite to the first one, the movement is caused from the release position to the actuation position, in which, instead, is possible to use the manoeuvring rod 1 for handling the tool 50.

Figure 6A:
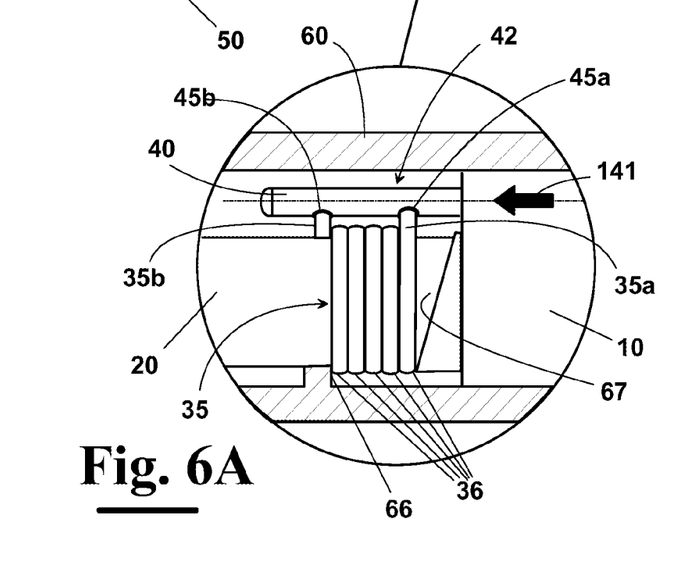
FIG. 6A shows, in a partially sectioned view, an enlargement of a part of the manoeuvring rod of FIG. 5, in order to highlight some constructive aspects in the unblocking configuration.
Figure 6B:
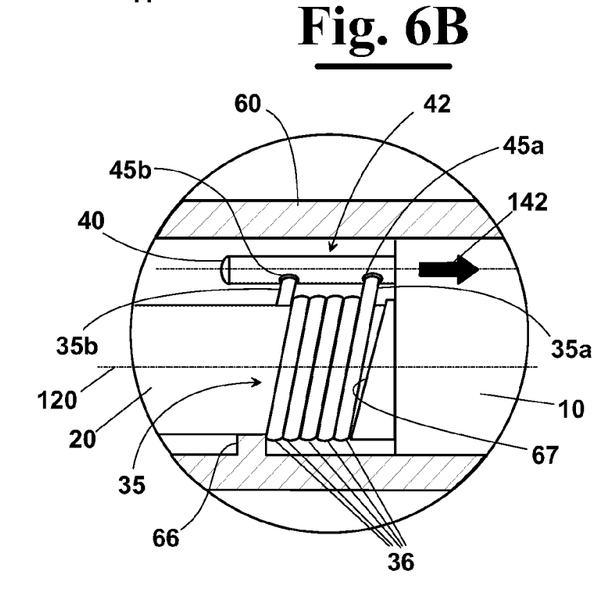
FIG. 6B shows, in a partially sectioned view, an enlargement of a part of the manoeuvring rod of FIG. 1, in order to highlight some constructive aspects in the blocking configuration.

In an exemplary embodiment of the invention alternative to the previous one and diagrammatically shown in the figures from 5 to 6B, the actuation member 40 is configured in such a way to move from an actuation position to the release position through a translation in a first direction 141, and from the release position to the actuation position through a translation in a second direction 142, opposite to the first. In particular, the clamping cable 35 has a predetermined fixed length such that it is lightly slack about the second elongated portion 20, leaving, therefore, the latter in the unblocking position, completely free to slide (FIG. 6A). When, by acting on the control member 55, the actuation member 40 is caused to slide in the direction of the arrow 142, the turns of coil 36 are forced to tighten the second portion 20, in particular by arranging in an oblique position with respect to the same, for example owing to the presence of a first, and of a second abutment surface 66 and 67 arranged at opposite sides of the turns of coil 36 (FIG. 6B). In particular, the abutment surface 67 is configured in such a way to force the turns of coil 36 to arrange in the oblique position with respect to the longitudinal axis 120 of the second elongated portion 20. This, as can be easily understood, would cause an elongation of the development of each turn of coil, which, instead, is made of an inextensible material and therefore not allowing such elongation, adheres to the portion 20 and firmly tightens the same, thus impeding its sliding. It is to be noted that any sliding force that is applied, in case, during the use, to the second elongated portion 20 of the manoeuvring rod 1, in the direction of the arrow 142, would cause the turns of coil 36 to be positioned more oblique and stretched, thus further increasing their blocking action on the second elongated portion 20. This last aspect can be also exploited to cause a unidirectional movement of the second elongated portion 20. More precisely, by exerting on the actuation member 40 only a small tensile force that is not enough to block, for example by means of a spring, not shown in figure for reasons of simplicity, having a low elastic constant, and that acts, in particular, on an intermediate position of the actuation member 40, the second elongated portion 20 is free to slide in the direction opposite to arrow 142, (tending to make the turns of coil 36 less oblique, and thus decreasing the already little grasp), instead in the opposite sliding direction, i.e. in the direction of arrow 142, the little grasp on the portion 20 will tend to make the turns of coil 36 more oblique, thus increasing the grasp and, therefore, preventing the portion 20 to slide in the direction of arrow 142. Therefore, the technical solution above disclosed allows the telescopic manoeuvring rod 1 to be lengthened with no need to lay on the ground the end where tool 50 is arranged, because it will be sufficient, in this control position, to apply one, or more, alternated and decided movements in the movement direction in order that, since the return is impeded the sliding part can move only in the desired elongation direction, owing to inertia. It is to be noted that any solution providing to use the sliding motion of the actuation member 40 instead of its rotation, can be also carried out by using, alternatively to the clamping cable 35, also a wire, preferably made of steel, substantially spring-shaped, or, by replacing the, or each, turn of coil 36 with a determined number of annular elements 36', or little rings, preferably made of metal, that, analogously to what described above, are moved by 2 protrusions, or actuation teeth, 46a and 46b of the actuation member 40, and that have an in internal diameter such that they can freely slide on the second portion 20 when they are arranged substantially coaxial to the second portion (FIG. 6C), and that, instead, are not able to slide when they are forced by the actuation teeth 46a and 46b in an oblique position with respect to the second portion 20 (FIG. 6D).

Figure 6C:
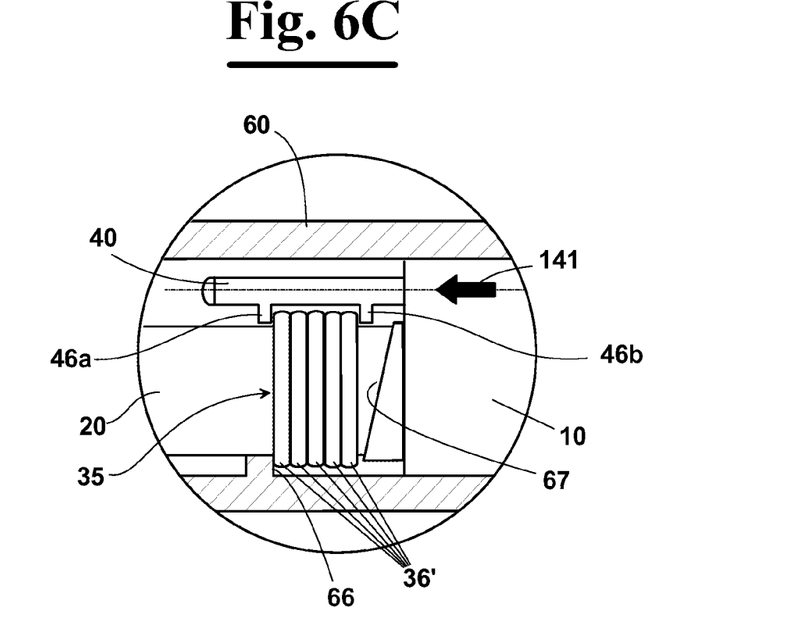
FIGS. 6C and 6D show, respectively in an unblocking configuration and in a blocking configuration, an alternative embodiment provided by the invention of the blocking member of the FIGS. 6A and 6B.
Figure 6D:
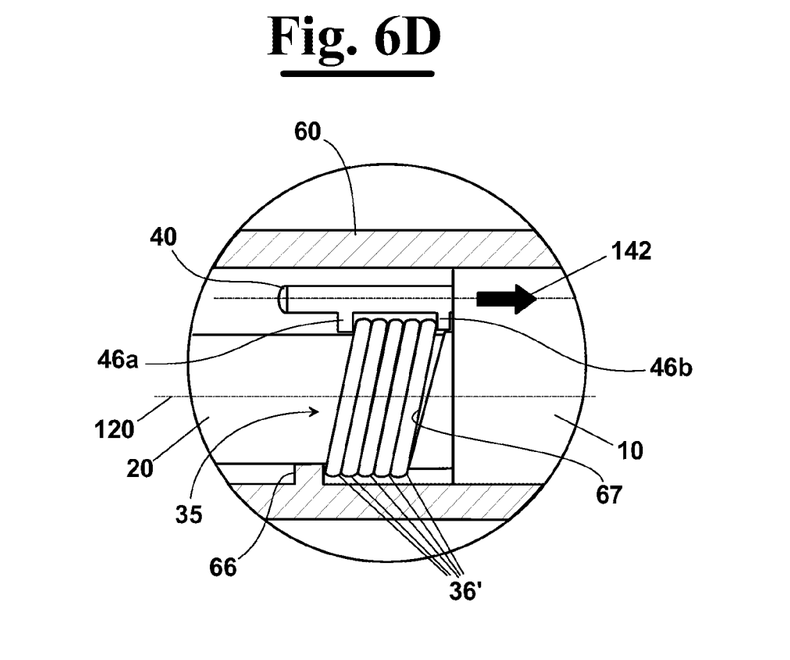

It is also to be noted that the blocking action that is shown in FIG. 6B in the case of a cable, and in FIG. 6D in the case of the annular elements 36', could be analogously obtained by translating the actuation member 40 with respect to the same position of free sliding shown in FIG. 6A, or in FIG. 6C, in the direction opposite to the one shown, in order to force the turns 36, or the annular elements 36', to position obliquely in the opposite direction, specularly, thus obtaining an analogous blocking action.

With reference to the exemplary embodiments shown in the FIGS. 6C and 6D, when the user acts on the control member 55 for moving the actuation member 40 in the release position (FIG. 6C), the actuation tooth 46b positioned downstream of the annular elements 36' along the translation direction, displaces the annular elements 36' in a position in which they are arranged substantially coaxial to the elongated portion 20 and, therefore, they do not impede the free sliding of elongated portion 20 with respect to the elongated portion 10, i.e. the above disclosed unblocking configuration is obtained. Instead, when the user acts on the control member 55 to move the actuation member 40 in the actuation position (FIG. 6D), the actuation tooth 46a, arranged downstream of the annular elements 36' along the translation direction, causes the, or each, blocking annular member 36' to move in an oblique position with respect to the axis 120 of the elongated portion 20 in which they impede the free sliding of elongated portion 20 with respect to the elongated portion 10. More precisely, the oblique position is obtained because an abutment surface 67 is provided arranged in an oblique position with respect to axis 120 of elongated portion 20.

Obviously, in all the embodiments, in order to obtain the return of sliding portion, without laying on the ground the end holding the tool, it will be sufficient to steer the telescopic manoeuvring rod 1 upward because in the unblocking position is the weight of the sliding portion to cause its return.

According to the invention, depending on the constructive solution that is adopted, both the above disclosed rotation and the above disclosed translation of the actuation member 40 can be caused by the user by acting accordingly on the control member 55. For example, again depending on the constructive solution that is adopted, the user can actuate the control member 55 in order to cause it to translate, in particular to translate longitudinally to the first portion 10 (FIG. 5), or to rotate (see FIG. 7), or also a combination of movements comprising at least a rotation and at least a translation of the control member 55. Generally, according as the control member 55 is translated in a direction, or in the opposite direction, or is rotated in a direction, or in the opposite direction, or is moved through a first series of movements, or a second series of movements opposite to the first series, the user will cause the actuation member 40 to move from the release position to the actuation position, or vice versa.

As shown in the embodiment of FIG. 4, the first portion 10 of the manoeuvring rod 1 can provide a first longitudinal cavity 11 at which, in use, the second elongated portion 20 is telescopically engaged to the first portion 10, and a second longitudinal cavity 12, preferably eccentrically arranged with respect to the first longitudinal cavity 11, arranged to house, in use, the actuation member 40. This latter can be a bar, for example a bar made of metallic material, or plastic material. Still with reference to FIG. 4 an anti-rotational member can be, furthermore, provided, for example a tooth 25, arranged to impede the second elongated portion 20 to rotate with respect to the first elongated portion 10, during its sliding, or, in any case, when is not blocked. In particular, the anti-rotational member 25 can be an element protruding from the external surface 23 of the second elongated portion 20 and arranged at a groove 16 provided between the two longitudinal cavities 11 and 12 above disclosed.

In particular, the actuation bar 40 is mounted within the second longitudinal cavity 12 in such a way to be able to rotate about the rotation axis 140, in a first direction of rotation, or in a second direction of rotation, opposite to the first, when the user manually actuates the control member 55 in one of the manner above disclosed. More in particular, the rotation of the actuation bar 40 in the first direction of rotation produces a tensile force on the clamping cable 35 and, therefore, causes the second elongated portion 20 of the manoeuvring rod to be tightened by the cable, and, therefore, to block the second elongated portion in a determined position with respect to the first portion 10. Instead, when the user acts on the control member 55 in one of the manner above described, in order to cause the actuation bar 40 to rotate in the second direction of rotation, opposite to the first, the cable 35 is not subjected to the above disclosed tensile force and, therefore, the second elongated portion 20 of manoeuvring rod 1 is substantially disengaged thus resulting to be free to slide with respect to the first portion 10.

As diagrammatically shown in FIG. 6A, the above disclosed clamping cable 35 provides a first and a second end 35a and 35b fixed to the actuation member 40, for example at respective through holes 45a and 45b.

As shown in detail in the FIG. 2, 6A, 6B and 8, an actuation portion 42 of an actuation bar 40 can advantageously protrude by a predetermined length from the second longitudinal cavity 12 of the first portion 10 of the manoeuvring rod 1. In particular, a protective bushing 60 can be provided configured to cover, in use, an actuation portion 42 and the, or each, turn of coil 36 of the clamping cable 35. More in particular, the protective bushing 60 can be configured to engage the first portion 10 of the manoeuvring rod 1. In this way, it is avoided that the above disclosed mechanism of the blocking/unblocking device 30 according to the invention, can become damaged, or in any case reduce its efficiency, owing to infiltration of dust, or humidity, or fragments of material of different kind that are produced during the use of the tool 50.

As shown in the embodiment of FIG. 8, an actuation portion 42 can be associated to a protective case 47, for example made of metallic material, or plastic material, configured to guide the ends 35a and 35b of the clamping cable 35 during the rotation of the actuation member 40 in the actuation, or release step. Still as shown in the example of FIG. 8, the protective bushing 60 can be provided with the abutment surface 66, for example made at an abutment tooth 65 arranged to axially contain the, or each, turn of coil 36 of the clamping cable 35 wound about the second portion 20, or, as shown in FIG. 6A, to allow, together with the opposite abutment 67, that the turns of coil 36 are correctly positioned corresponding to the shown position of free sliding.

It is appropriate to specify that, even though not shown in the figures from 1 to 8, the manoeuvring rod 1, according to the invention, depending on the tool 50 of which is provided with, can be equipped with members of electrical and/or mechanical transmission, or of other kind, necessary to move the tool 50. In particular, the manoeuvring rod 1 can contain within itself at least an extensible, preferably spiral, electric cable, arranged to transmit, starting from the handle portion 15, the electric power that is necessary to supply the tool 50 and to actuate the same. Likewise, if the tool 50 is of pneumatic type, the manoeuvring rod 1 can contain within itself an extensible, preferably spiral, tube arranged to transport, starting from the handle portion 15, the compressed air necessary to supply and actuate the tool 50.

The foregoing description exemplary embodiments of the invention will so fully reveal the invention according to the conceptual point of view, so that others, by applying current knowledge, will be able to modify and/or adapt for various applications such embodiment without further research and without parting from the invention, and, accordingly, it is therefore to be understood that such adaptations and modifications will have to be considered as equivalent to the specific embodiments. The means and the materials to realize the different functions described herein could have a different nature without, for this reason, departing from the field of the invention. It is to be understood that the phraseology or terminology that is employed herein is for the purpose of description and not of limitation.

The invention claimed is:

1. A telescopic maneuvering rod comprising:
    a first elongated portion having a tubular shape and including a handle portion at which a user grasps said telescopic maneuvering rod;
    a second elongated portion telescopically engaged with said first elongated portion at a first end and configured to freely slide with respect to the first elongated portion, said second elongated portion being, furthermore, engageable with to a working tool at a second end;
    a blocking/unblocking device arranged to move between a blocking configuration in which the blocking/unblocking device impedes said second elongated portion from freely sliding with respect to said first elongated portion, and an unblocking configuration in which said blocking/unblocking device allows said second elongated portion to freely slide with respect to said first elongated portion;
    a control member configured to be hand-operated by said user to cause said blocking/unblocking device to move from said blocking configuration to said unblocking configuration, and vice versa, said control member being positioned at said handle portion, whereby said user is able to operate the control member substantially without changing the grasp on the handle portion with respect to a normal working position
    wherein said blocking/unblocking device comprises:
        a blocking member configured to move from a blocking position of said second elongated portion in which blocking member impedes free sliding of said second elongated portion with respect to said first elongated portion, and an unblocking position in which blocking member allows free sliding of said second elongated portion with respect to said first elongated portion;
        an actuation member configured to actuate said blocking member to move from said blocking position to said unblocking position, said actuation member being operatively connected to said blocking member and to said control member;

wherein said blocking member is a clamping cable that is wound about said second elongated portion, in such a way to form at least one turn of coil, and wherein said actuation member is configured to move between an actuation position, in which the actuation member is arranged to generate a predetermined tensile force on said clamping cable and, therefore, to tighten said second elongated portion of said maneuvering rod at said at least one turn of coil, thus impeding said free sliding, and a release position, in which said clamping cable is not subjected to said predetermined tensile force and, therefore, said at least one turn of coil is slack about said second elongated portion and allows said free sliding;

wherein said actuation member is configured to translate in a first direction in order to move from said actuation position to said release position, and in a second direction opposite to the first, in order to move from said release position to said actuation position, and wherein a first abutment surface and a second abutment surface are provided arranged at opposite sides of said at least one turn of coil, said first and said second abutment surfaces configured such that, when said actuation member is moved to said actuation position, said at least one turn of coil is forced to move to an oblique position about said second elongated portion to firmly tighten against the second elongated portion to impede said second elongated portion from free sliding with respect to said first elongated portion.

2. The telescopic maneuvering rod according to claim 1, wherein said blocking member includes at least one annular element positioned about said second elongated portion, said actuation member configured to cause said at least one annular element to move between said unblocking position in which the actuation member is arranged substantially coaxial to said second elongated portion, and, therefore, allows said free sliding, and said blocking position, in which said at least one annular element is positioned oblique with respect to said second elongated portion and, therefore, impedes said free sliding.

3. The telescopic maneuvering rod according to claim 2, wherein said actuation member includes a first actuation tooth and a second actuation tooth arranged at opposite sides of said at least one annular element, said first and second actuation teeth configured to cause said at least one annular element to move from said blocking position, to said unblocking position, or vice versa.

4. The telescopic maneuvering rod according to claim 2, wherein said second elongated portion includes an abutment surface configured to cause said at least one annular element to position in said oblique position at said blocking position.

5. The telescopic maneuvering rod, according to claim 1, wherein said actuation member is configured to rotate in a first direction of rotation to move from said actuation position to said release position, and in a second direction of rotation opposite to the first, in order to move from said release position to said actuation position.

6. The telescopic maneuvering rod, according to claim 1, wherein said control member is configured to translate along a first, or a second direction, opposite to the first direction, or to rotate in a first direction of rotation, or in a second direction of rotation, opposite to the first direction of rotation, or to make a first series of movements comprising at least a first rotation and at least a first translation, or a second series of movements comprising at least a second rotation and at least a second translation, to cause said actuation member to move from said actuation position to said release position, or vice versa.

7. The telescopic maneuvering rod, according to claim 1, wherein said actuation member is an actuation bar having a control portion operatively connected to said control member, and an actuation portion operatively connected to said clamping cable.

8. The telescopic maneuvering rod, according to claim 7, wherein said first elongated portion includes a first longitudinal cavity in which, in use, said second elongated portion is telescopically engaged to said first elongated portion, and a second longitudinal cavity eccentrically arranged with respect to said first longitudinal cavity and arranged to house, in use, said actuation member.

9. The telescopic maneuvering rod according to claim 8, wherein said actuation portion is configured to protrude by a predetermined length from said second longitudinal cavity of said first elongated portion.

10. The telescopic maneuvering rod according to claim 8, and further comprising a protective bushing configured to cover, in use, said actuation portion and said at least one turn of coil of said clamping cable, said protective bushing providing an abutment surface configured to axially house said at least one turn of coil.

11. The telescopic maneuvering rod, according to claim 8, wherein an anti-rotational member is, furthermore, provided arranged to impede said second elongated portion to rotate with respect to said first portion, said anti-rotational member being an element protruding from an external surface of said second elongated portion at the end and positioned, in use, at a groove provided between said first and said second longitudinal cavity.

12. A telescopic maneuvering rod comprising:
a first elongated portion having a tubular shape and including a handle portion at which a user grasps said telescopic maneuvering rod;
a second elongated portion telescopically engaged with said first elongated portion at a first end and configured to freely slide with respect to the first elongated portion, said second elongated portion being, furthermore, engageable with a working tool at a second end;
a blocking/unblocking device arranged to move between a blocking configuration in which the blocking/unblocking device impedes said second elongated portion from freely sliding with respect to said first elongated portion, and an unblocking configuration in which said blocking/unblocking device allows said second elongated portion to freely slide with respect to said first elongated portion;
a control member configured to be hand-operated by said user to cause said blocking/unblocking device to move from said blocking configuration to said unblocking configuration, and vice versa, said control member being positioned at said handle portion, whereby said user is able to operate the control member substantially without changing the grasp on the handle portion with respect to a normal working position;
wherein said blocking/unblocking device comprises:
a blocking member configured to move from a blocking position of said second elongated portion in which blocking member impedes free sliding of said second elongated portion with respect to said first elongated portion, and an unblocking position in which blocking member allows free sliding of said second elongated portion with respect to said first elongated portion;
an actuation member configured to actuate said blocking member to move from said blocking position to said unblocking position, said actuation member being operatively connected to said blocking member and to said control member;
wherein said blocking member is a clamping cable that is wound about said second elongated portion, in such a way to for at least one turn of coil, and wherein said actuation member is configured to move between an actuation position, in which the actuation member is arranged to generate a predetermined tensile force on said clamping cable and, therefore, to tighten said second elongated portion of said maneuvering rod at said at least one turn of coil, thus impeding said free sliding, and a release position, in which said clamping cable is not subjected to said predetermined tensile force and, therefore, said at least one turn of coil is slack about said second elongated portion and allows said free sliding;
wherein said blocking member includes at least one annular element positioned about said second elongated portion, said actuation member configured to cause said at least one annular element to move between said unblocking position in which the actuation member is arranged substantially coaxial to said second elongated portion, and, therefore, allows said free sliding, and said blocking position, in which said at least one annular element is positioned oblique with respect to said second elongated portion and, therefore, impedes said free sliding;
wherein said actuation member includes a first actuation tooth and a second actuation tooth arranged at opposite sides of said at least one annular element, said first and second actuation teeth configured to cause said at least one annular element to move from said blocking position, to said unblocking position, or vice versa.

13. A telescopic maneuvering rod comprising:
a first elongated portion having a tubular shape and including a handle portion at which a user grasps said telescopic maneuvering rod;
a second elongated portion telescopically engaged with said first elongated portion at a first end and configured to freely slide with respect to the first elongated portion, said second elongated portion being, furthermore, engageable with a working tool at a second end;
a blocking/unblocking device arranged to move between a blocking configuration in which the blocking/unblocking device impedes said second elongated portion from freely sliding with respect to said first elongated portion, and an unblocking configuration in which said blocking/unblocking device allows said second elongated portion to freely slide with respect to said first elongated portion;
a control member configured to be hand-operated by said user to cause said blocking/unblocking device to move from said blocking configuration to said unblocking configuration, and vice versa, said control member being positioned at said handle portion, whereby said user is able to operate the control member substantially without changing the grasp on the handle portion with respect to a normal working position;
wherein said blocking/unblocking device comprises:
a blocking member configured to move from a blocking position of said second elongated portion in which blocking member impedes free sliding of said second elongated portion with respect to said first elongated portion, and an unblocking position in which blocking member allows free sliding of said second elongated portion with respect to said first elongated portion:
an actuation member configured to actuate said blocking member to move from said blocking position to said unblocking position, said actuation member being operatively connected to said blocking member and to said control member;
wherein said blocking member is a clamping cable that is wound about said second elongated portion, in such a way to form at least one turn of coil, and wherein said actuation member is configured to move between an actuation position, in which the actuation member is arranged to generate a predetermined tensile force on said clamping cable and, therefore, to tighten said second elongated portion of said maneuvering rod at said at least one turn of coil, thus impeding said free sliding, and a release position, in which said clamping cable is not subjected to said predetermined tensile force and, therefore, said at least one turn of coil is slack about said second elongated portion and allows said free sliding;
a protective bushing configured to cover, in use, at least a portion of said actuation member portion and said at least one turn of coil of said clamping cable, said protective bushing providing an abutment surface configured to axially house said at least one turn of coil.

* * * * *